United States Patent
Jeyapaul et al.

(10) Patent No.: US 9,274,854 B2
(45) Date of Patent: Mar. 1, 2016

(54) CONTAMINATION BASED WORKLOAD MANAGEMENT

(75) Inventors: Rajesh K. Jeyapaul, Bangalore (IN); Alfredo V. Mendoza, Georgetown, TX (US)

(73) Assignee: International Business Machines Corporation, Armonk, NY (US)

(*) Notice: Subject to any disclaimer, the term of this patent is extended or adjusted under 35 U.S.C. 154(b) by 887 days.

(21) Appl. No.: 13/560,684

(22) Filed: Jul. 27, 2012

(65) Prior Publication Data

US 2014/0033222 A1   Jan. 30, 2014

(51) Int. Cl.
| | |
|---|---|
| G06F 9/46 | (2006.01) |
| G06F 9/50 | (2006.01) |
| G06F 11/07 | (2006.01) |
| G06F 11/14 | (2006.01) |
| G06F 12/00 | (2006.01) |
| G06F 11/30 | (2006.01) |

(52) U.S. Cl.
CPC .......... *G06F 9/5088* (2013.01); *G06F 11/0709* (2013.01); *G06F 11/0754* (2013.01); *G06F 11/0775* (2013.01); *G06F 11/1479* (2013.01); *G06F 11/3058* (2013.01); *G06F 11/3013* (2013.01); *G06F 2201/805* (2013.01)

(58) Field of Classification Search
CPC ... G06F 9/5094; G06F 9/5027; G06F 9/5088; G06F 9/505; G06F 9/5077; G06F 2201/81; G06F 1/20; G05F 11/3414; G05F 11/3433; G05F 11/3457; G01N 17/04; G01N 27/00; Y02B 60/142
USPC .................. 370/700; 709/201, 226; 718/105; 204/404; 702/188; 714/4
See application file for complete search history.

(56) References Cited

U.S. PATENT DOCUMENTS

| | | | |
|---|---|---|---|
| 6,077,418 A * | 6/2000 | Iseri et al. .................. 205/775.5 |
| 7,197,433 B2 | 3/2007 | Patel et al. | |
| 7,534,167 B2 | 5/2009 | Day | |
| 8,447,529 B2 * | 5/2013 | Hernandez et al. ............. 702/25 |
| 2007/0157210 A1 * | 7/2007 | Inoue ............................ 718/105 |
| 2008/0059972 A1 * | 3/2008 | Ding et al. .................... 718/105 |
| 2008/0109817 A1 * | 5/2008 | Nakamura .................... 718/105 |
| 2009/0037164 A1 | 2/2009 | Gaither et al. | |
| 2009/0172250 A1 * | 7/2009 | Allen et al. .................... 711/103 |
| 2010/0250831 A1 * | 9/2010 | O'Brien et al. ............... 711/103 |

(Continued)

FOREIGN PATENT DOCUMENTS

EP     2189875 A2   5/2010

OTHER PUBLICATIONS

Klein et al., IEEE, "Corrosion management for data centers", Mar. 20, 2011, http://ieeexplore.ieee.org/xpl/freeabs_all.jsp?arnumber=5767173, San Jose, CA, 1 page.

*Primary Examiner* — Alina N Boutah
(74) *Attorney, Agent, or Firm* — Jeffrey L. Streets

(57) ABSTRACT

Computer-implemented methods for workload management and related computer program products are disclosed. One method comprises receiving corrosion rate signals from a first sensor associated with a first compute node, determining a first corrosion level for the first compute node as a function of the corrosion rate signal received from the first sensor, and automatically removing a first workload from the first compute node in response to determining that the first compute node has a first corrosion level that is greater than a setpoint level of corrosion.

16 Claims, 11 Drawing Sheets

(56) References Cited

U.S. PATENT DOCUMENTS

| | | |
|---|---|---|
| 2011/0016473 A1 | 1/2011 | Srinivasan |
| 2011/0131431 A1 | 6/2011 | Akers et al. |
| 2011/0225997 A1 | 9/2011 | Gast, Jr. et al. |
| 2012/0007579 A1* | 1/2012 | Apblett et al. ............... 324/71.1 |
| 2012/0038377 A1* | 2/2012 | Hamann et al. ............... 324/700 |
| 2012/0179326 A1* | 7/2012 | Ghelam ...................... 701/31.9 |
| 2012/0233501 A1* | 9/2012 | Kanso et al. .................... 714/26 |
| 2012/0297123 A1* | 11/2012 | Cherubini et al. ............ 711/103 |
| 2013/0085802 A1* | 4/2013 | Belady et al. ................ 705/7.29 |
| 2013/0138419 A1* | 5/2013 | Lopez et al. .................... 703/21 |
| 2013/0179631 A1* | 7/2013 | Cepulis ........................ 711/103 |
| 2013/0265064 A1* | 10/2013 | Hamann et al. ............... 324/700 |

\* cited by examiner

CONTAMINATION BASED WORKLOAD MANAGEMENT

BACKGROUND OF THE INVENTION

1. Field of the Invention

The present invention relates to workload management in computer systems.

2. Background of the Related Art

In a cloud computing environment, a management system performs constant monitoring of numerous compute nodes that make up the cloud. Accordingly, the management system may take steps to balance the load among the individual compute nodes, and may deploy workloads to compute nodes that are able to perform appropriately.

In various implementations, the management system is the centralized point for workload distribution and has access to information about the operating condition of all servers and all workloads. The management system collects this information and uses it to determine how to move and rearrange workloads to accomplish one or more operational objective. The management system, such as a management server, is limited as to what information it can collect about the individual servers or hosts. In some systems, server operating conditions are exposed to the management server so that the management server can make a more informed decision as to which host should receive a given workload.

BRIEF SUMMARY OF THE INVENTION

One embodiment of the present invention provides a computer-implemented method for workload management and a related computer program product for workload management. The method comprises receiving corrosion rate signals from a first sensor associated with a first compute node, determining a first corrosion level for the first compute node as a function of the corrosion rate signal received from the first sensor, and automatically removing a first workload from the first compute node in response to determining that the first compute node has a first corrosion level that is greater than a setpoint level of corrosion.

Another embodiment of the invention provides a computer-implemented method for workload management, where the method comprises receiving corrosion rate signals from a first sensor associated with a first compute node and from a second sensor associated with a second compute node, determining a first corrosion level for the first compute node as a function of the corrosion rate signal received from the first sensor, determining a second corrosion level for the second compute node as a function of the corrosion rate signal received from the second sensor, identifying a maximum corrosion level for a first workload running on the first compute node, and automatically relocating the first workload from the first compute node to the second compute node in response to determining that the first corrosion level is greater than the maximum corrosion level for the first workload and that the second corrosion level is not greater than the maximum corrosion level for the first workload.

DETAILED DESCRIPTION OF THE INVENTION

Figure 1:
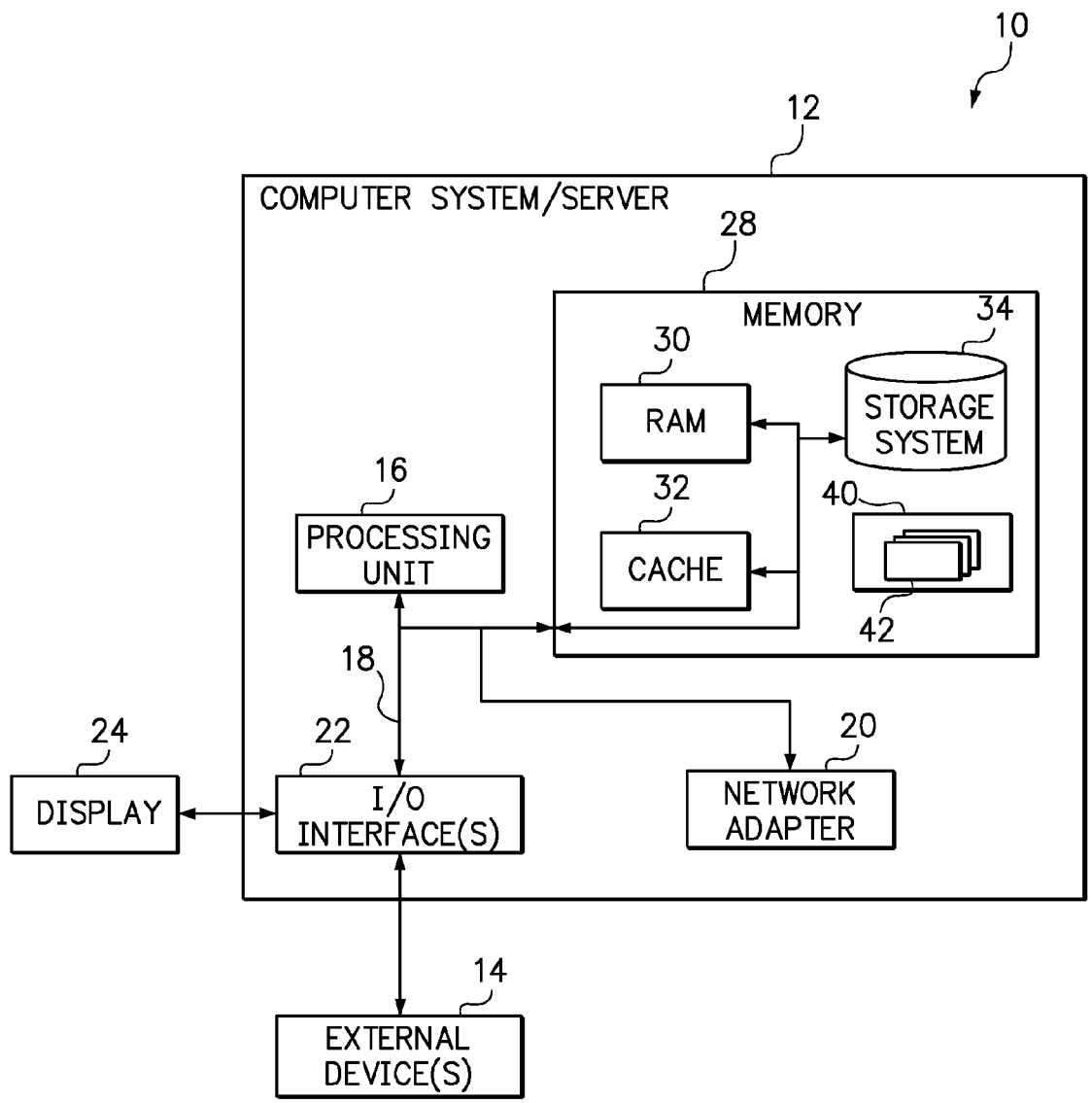
FIG. 1 is a diagram of a cloud computing node according to one or more embodiment of the present invention.

One embodiment of the present invention provides a computer-implemented method for workload management and a related computer program product for workload management. The method comprises receiving corrosion rate signals from a first sensor associated with a first compute node and from a second sensor associated with a second compute node, determining a first corrosion level for the first compute node as a function of the corrosion rate signal received from the first sensor, and automatically removing a first workload from the first compute node in response to determining that the first compute node has a first corrosion level that is greater than a setpoint level of corrosion.

The sensors are preferably corrosion rate sensors, such as those developed at International Business Machines Corporation and described in the IBM Research Report entitled "Corrosion Management for Data Centers", which appears in the papers of the Semiconductor Thermal Measurement and Management Symposium (SEMI-THERM), 2011 27th Annual IEEE, dated Mar. 20-24, 2011. These sensors have silver and copper thin films deposited on thermal conductive substrates. The film thickness reduction, due to electrochemical processes, result in an increased resistance with specific response from the silver and copper films due to different interactions with the surrounding environment. Due to the high sensitivity of this sensor, which is able to detect film thickness changes of less than 0.1 nanometers, it is possible to detect a daily variation in corrosion rate from day to night or a seasonal variation.

A sensor may be associated with a compute node by positioning the sensor inside the individual housing that contains the compute node so that the sensor is exposed to the same air contaminants and conditions as the compute node. This is the closest association between the sensor and the compute node. However, a sensor may be associated with a group of compute nodes by positioning the sensor inside a chassis or rack that contains any number of compute nodes. Due to the physical proximity of the compute nodes in a common chassis or rack, the corrosion rate may be assumed to be sufficiently similar that a single sensor or some strategic placement of several sensors within the chassis or rack may provide accurate corrosion rate measurements. Still further, in the situation where a network of compute nodes is spread out over multiple physical locations, such as different buildings or cities, a sensor may be associated with a compute node by positioning the sensor at the same location. For example, differences in the contaminants of ambient air may differ from one location to another due to emissions from adjacent businesses. A sensor at each location may be associated with each of the compute nodes in that location. In such a simple installation, the corrosion rate would be assumed to be the same for each compute node in the same location as the sensor.

A corrosion level for a compute node may be determined as a function of the corrosion rate signal received from the sensor. For example, a management node running a system management application may receive the corrosion rate signal from a sensor associated with any one or more compute node and use the corrosion rate to determine a corrosion level for the one or more compute nodes. In one option, system management maintains corrosion data for each compute node over the installed lifetime of each compute node. This corrosion data may be represented in a corrosion status table having a row for each compute node and a column providing the corrosion level for the compute node. Although the corrosion level may be determined in various manners and calculations, the corrosion level may be mathematical sum of individual daily corrosion rates. For example, if a corrosion sensor produces daily corrosion rate signals that, over a three day period, represent corrosion rates of 5 nm/day (day 1), 8 nm/day (day 2) and 14 nm/day (day 3), then any compute node associated with this corrosion sensor would add 27 nm of corrosion to its cumulative corrosion level. Such corrosion rates may be cumulated over the installed lifetime of each compute node.

A system administrator may provide the system management with a setpoint level of corrosion above which a compute node is considered to be unreliable. Accordingly, a workload is automatically removed from a first compute node in response to determining that the first compute node has a first corrosion level that is greater than the setpoint level of corrosion. As a result, the workload is not run on a compute node that is considered to be unreliable.

When a workload has been removed from a compute node, that workload may be either saved to a computer readable storage medium or relocated to another compute node. In the former option, an image of the workload is saved on a computer readable storage medium or device that is accessible to the management node independent of the first compute node. If the workload is to be resumed, then the image of the workload may be redeploying to a second compute node having a second corrosion level that is not greater than the setpoint level of corrosion.

In a second option, a workload is removed compute node by automatically relocating the workload from a first compute node to the second compute node in response to determining that the first corrosion level of the first compute node is greater than a setpoint level of corrosion and the second corrosion level of the second compute node is not greater than the setpoint level of corrosion. Relocating a workload may also be referred to as "migrating" the workload.

It should also be recognized that the corrosion levels of compute nodes in a virtual environment may be used in provisioning new workloads. A new workload would preferably be provisioned to a compute node having a corrosion level that is less than the setpoint level of corrosion. Still, if the available compute nodes are operating near capacity, a workload having a low priority might still be provisioned to a compute node having a corrosion level greater than the setpoint level of corrosion.

It is also preferable to avoid relocating a workload from one unreliable compute node to another unreliable compute node. Therefore, a workload may be automatically relocated from the first compute node to a second compute node in response to determining that the first corrosion level of the first compute node is greater than the setpoint level of corrosion and that a second corrosion level of the second compute node is not greater than the setpoint level of corrosion.

Although the sensors are preferably original equipment and are preferably installed during the entire installed lifetime of any given compute node in a given system, it should be recognized that the sensors may be installed in existing systems and associated with one or more compute nodes. Corrosion levels prior to sensor installation may be estimated and manually entered into the corrosion level table. If the installed age of each compute node is known, the corrosion levels manually entered may be proportional to the age of the compute node and an estimate of the average corrosion rate over that time period.

In embodiments of the invention, the method may include automatically removing all of the workloads running on a compute node in response to determining that the corrosion level in that compute node is greater than a setpoint level of corrosion. This is a conservative mode of operation that will avoid use of the compute node that has experienced sufficient corrosion to make its operation questionable. After removing all workloads, this compute node may be shut down. The handling of the removed workloads may be saved to a compute readable storage medium or immediately relocated to another compute node.

The method described herein may be implemented by a local or remote management node with respect to compute nodes within the same or different chassis, the same or different rack, or the same or different locations including data centers, buildings, cities, and the like. For example, a first compute node and a first sensor may be in a first location exposed to a first set of environmental conditions and a second compute node and a second sensor may be in a second location exposed to a second set of environmental conditions. The invention is equally applicable to any number of workloads, on any number of compute nodes, in any number of locations. Still further, a sensor may be associated with any number of compute nodes.

Another embodiment of the invention provides a computer-implemented method for workload management, where the method comprises receiving corrosion rate signals from a first sensor associated with a first compute node and from a second sensor associated with a second compute node, determining a first corrosion level for the first compute node as a function of the corrosion rate signal received from the first sensor, determining a second corrosion level for the second compute node as a function of the corrosion rate signal received from the second sensor, identifying a maximum corrosion level for a first workload running on the first compute node, and automatically relocating the first workload from the first compute node to the second compute node in response to determining that the first corrosion level is greater than the maximum corrosion level for the first workload and that the second corrosion level is not greater than the maximum corrosion level for the first workload.

Optionally, the maximum corrosion level for a workload is included in a workload profile. Preferably, a management node will maintain a workload profile table having a row for each workload and a column that identifies a maximum corrosion level for that workload. The column may include specific maximum corrosion levels or may identify a type or category of function that is provided by the workload. Where a type or category of function is provided, a separate table or key is needed in order to identify a maximum corrosion level for each workload type or category. Using the type or category provides a simple way for each workload a certain type to be assigned the same maximum corrosion level. For example, certain critical workloads may be high-priority "sales-related" workloads that are assigned maximum corrosion levels that are low relative to maximum corrosion levels that are assigned to low-priority "accounting-related" workloads. Accordingly, the high-priority workloads are placed on the more reliable compute nodes (lower corrosion) and the low-priority workloads are place on the less reliable compute nodes (higher corrosion).

It should be understood that even though a first workload may be removed from a first compute node due to the corrosion level exceeding the maximum corrosion level of the first workload, a second workload may continue to be run on the first compute node in response to determining that the first corrosion level is not greater than a maximum corrosion level for the second workload.

A further embodiment may be implemented having a sensor service and workload management service integrated into a remote system management software, such as IBM's Systems Director. The sensor service monitors the corrosion rate and the workload management service performs the image management, such as relocation of a workload. By having the sensor service frequently monitoring and updating the corrosion rate to the workload management service, action can be taken to timely relocate a workload to a healthy compute node or server. This will maintain high resilience of the system as well the high availability of the applications running in the server.

Yet another embodiment of the present invention provides a computer program product including computer usable program code embodied on a computer usable storage medium for managing workload in a computer system. The computer program product may be able to implement any of the computer-implemented methods described herein. In one example, the computer program product comprises computer usable program code for receiving corrosion rate signals from a first sensor associated with a first compute node and from a second sensor associated with a second compute node, computer usable program code for determining a first corrosion level for the first compute node as a function of the corrosion rate signal received from the first sensor, and computer usable program code for automatically removing a first workload from the first compute node in response to determining that the first compute node has a first corrosion level that is greater than a setpoint level of corrosion.

Embodiments of the present invention may be combined with other known criteria for relocating (migrating), capturing, or provisioning workloads, including compute node (server) resource utilization, compute node performance, and energy consumption. The importance of considering corrosion levels in relocating, capturing or provisioning of workloads is perhaps greatest in datacenters that utilize air-side economizers for cooling (i.e., using outside air as a means of cooling the indoor space). The use of contaminated outside air leads to a high probability that components in these compute nodes will get corroded over a period of time, perhaps eventually leading to an unpredictable failure of the compute node.

It should be understood that although this disclosure is applicable to cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
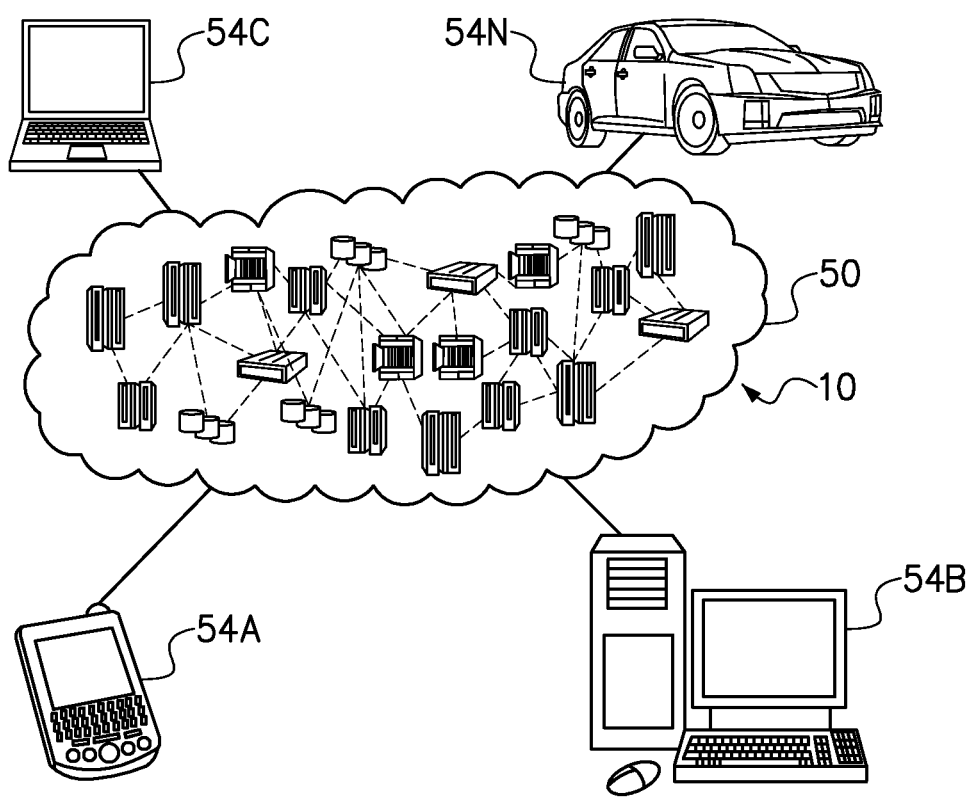
FIG. 2 is a diagram of a cloud computing environment according to one or more embodiment of the present invention.

Referring now to FIG. 2, an illustrative cloud computing environment 50 is depicted. As shown, the cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
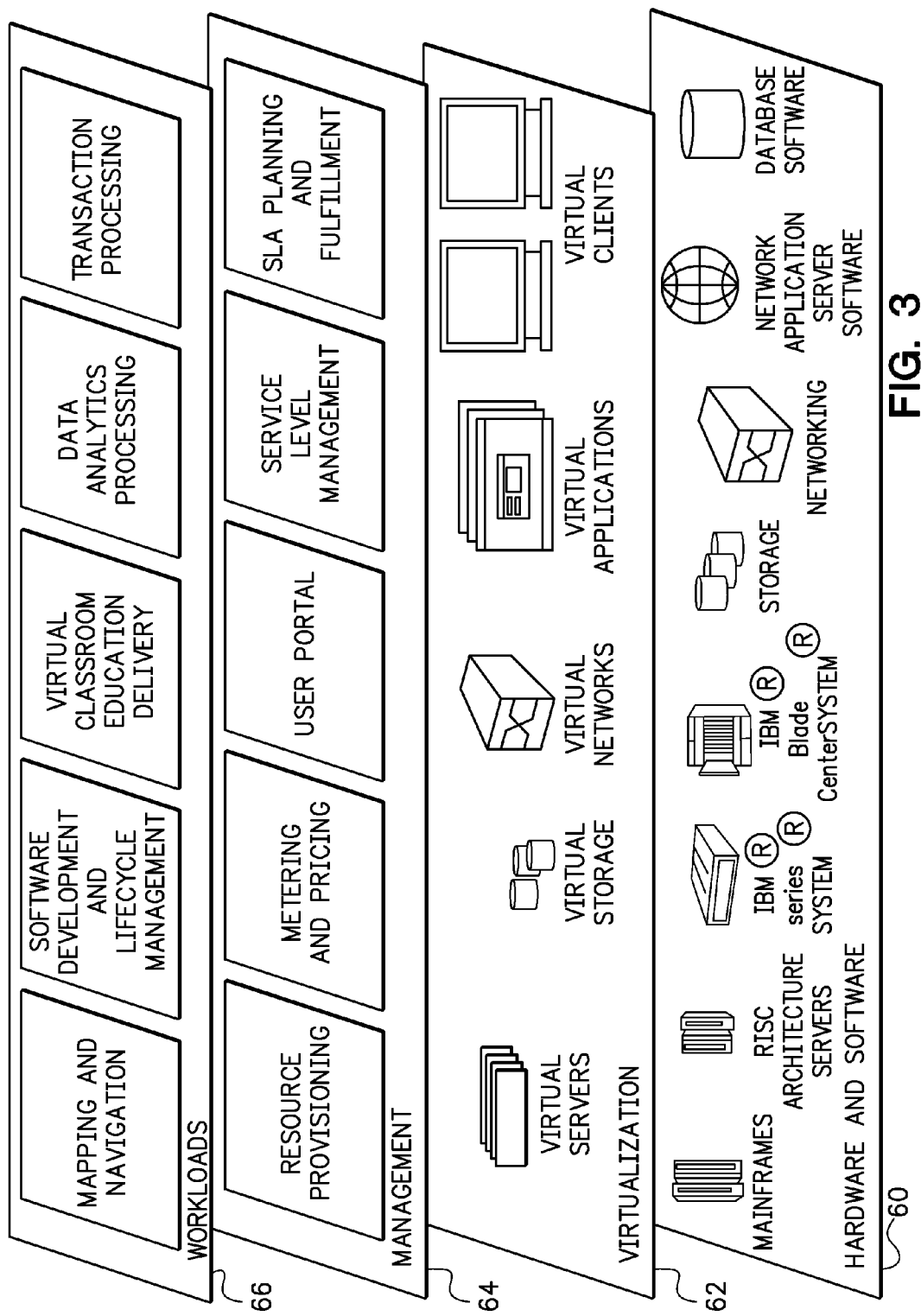
FIG. 3 is a diagram depicting abstraction model layers according to one or more embodiment of the present invention.

Referring now to FIG. 3, a set of functional abstraction layers provided by cloud computing environment 50 (Shown in FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 4:
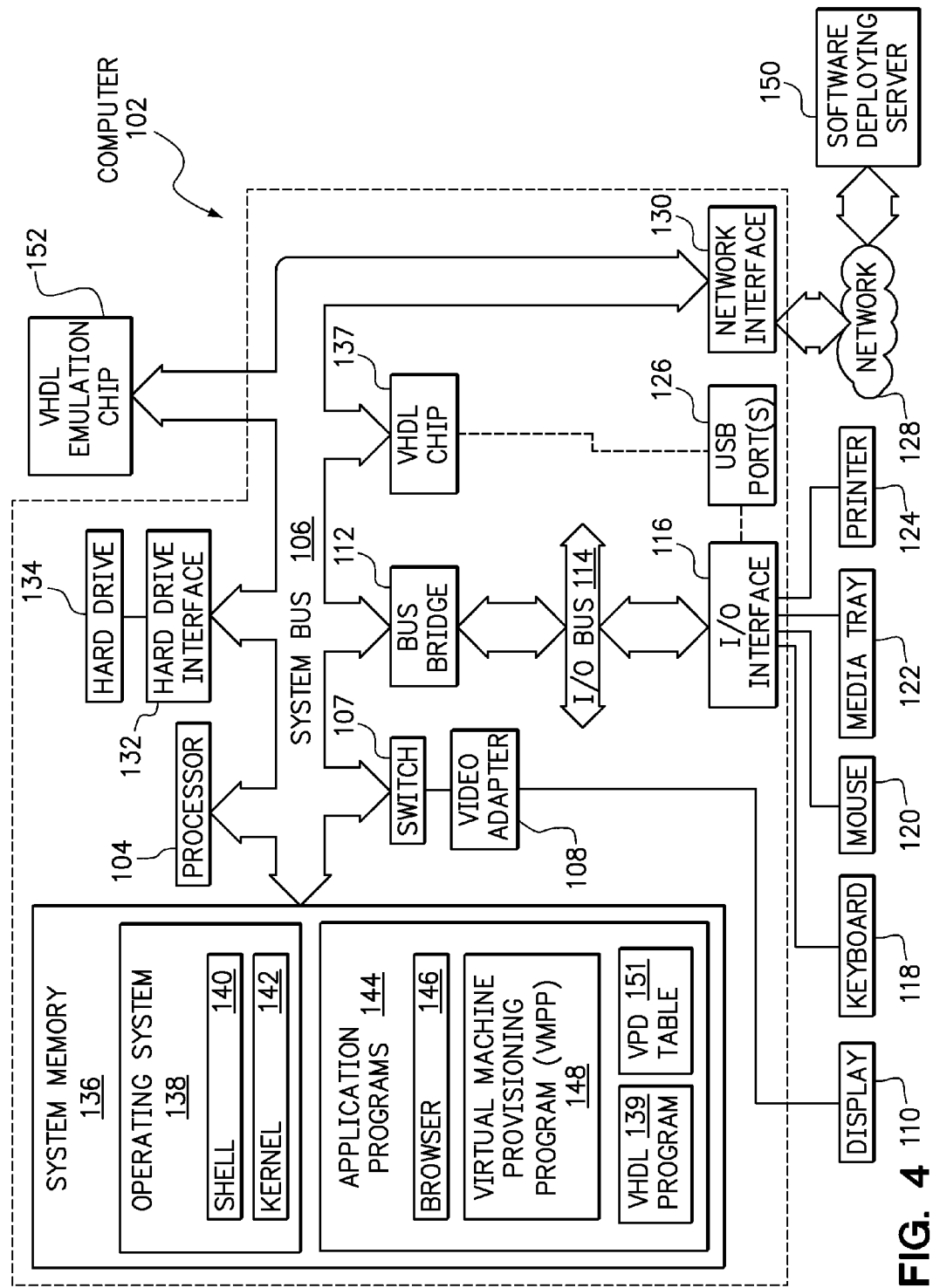
FIG. 4 is a diagram of an exemplary computing node that may be utilized according to one or more embodiments of the present invention.

FIG. 4 depicts an exemplary computing node (or simply "computer") 102 that may be utilized in accordance with one or more embodiments of the present invention. Note that some or all of the exemplary architecture, including both depicted hardware and software, shown for and within computer 102 may be utilized by the software deploying server 150, as well as the provisioning manager/management node 222 and the server blades 204*a-n* shown in FIG. 5. Note that while the server blades described in the present disclosure are described and depicted in exemplary manner as server blades in a blade chassis, some or all of the computers described herein may be stand-alone computers, servers, or other integrated or stand-alone computing devices. Thus, the terms "blade," "server blade," "computer," and "server" are used interchangeably in the present descriptions.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., virtual machine provisioning program—VMPP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, some or all of these ports may be universal serial bus (USB) ports.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in the system memory of computer 102 (as well as the system memory of the software deploying server 150) also include a virtual machine provisioning program (VMPP) 148. VMPP 148 includes code for implementing the processes described below, including those described in FIGS. 2-8. VMPP 148 is able to communicate with a vital product data (VPD) table 151, which provides required VPD data described below. In one embodiment, the computer 102 is able to download VMPP 148 from software deploying server 150, including in an on-demand basis. Note further that, in one embodiment of the present invention, software deploying server 150 performs all of the functions associated with the present invention (including execution of VMPP 148), thus freeing computer 102 from having to use its own internal computing resources to execute VMPP 148.

Also stored in the system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from VMPP 148 causes the VHDL program 139 to configure the VHDL chip 137, which may be an FPGA, ASIC, or the like.

In another embodiment of the present invention, execution of instructions from VMPP 148 results in a utilization of VHDL program 139 to program a VHDL emulation chip 151. VHDL emulation chip 151 may incorporate a similar architecture as described above for VHDL chip 137. Once VMPP 148 and VHDL program 139 program VHDL emulation chip 151, VHDL emulation chip 151 performs, as hardware, some or all functions described by one or more executions of some or all of the instructions found in VMPP 148. That is, the VHDL emulation chip 151 is a hardware emulation of some or all of the software instructions found in VMPP 148. In one embodiment, VHDL emulation chip 151 is a programmable read only memory (PROM) that, once burned in accordance with instructions from VMPP 148 and VHDL program 139, is permanently transformed into a new circuitry that performs the functions needed to perform the processes of the present invention.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

A cloud computing environment allows a user workload to be assigned to a virtual machine (VM) or logical partition somewhere in the computing cloud. This virtual machine provides the software operating system and physical resources such as processing power and memory to support the user's application workload. The present disclosure describes methods for placing virtual machines among physical servers based on workload bids submitted by a plurality of servers in response to a workload bid request received from another one of the servers.

Figure 5:
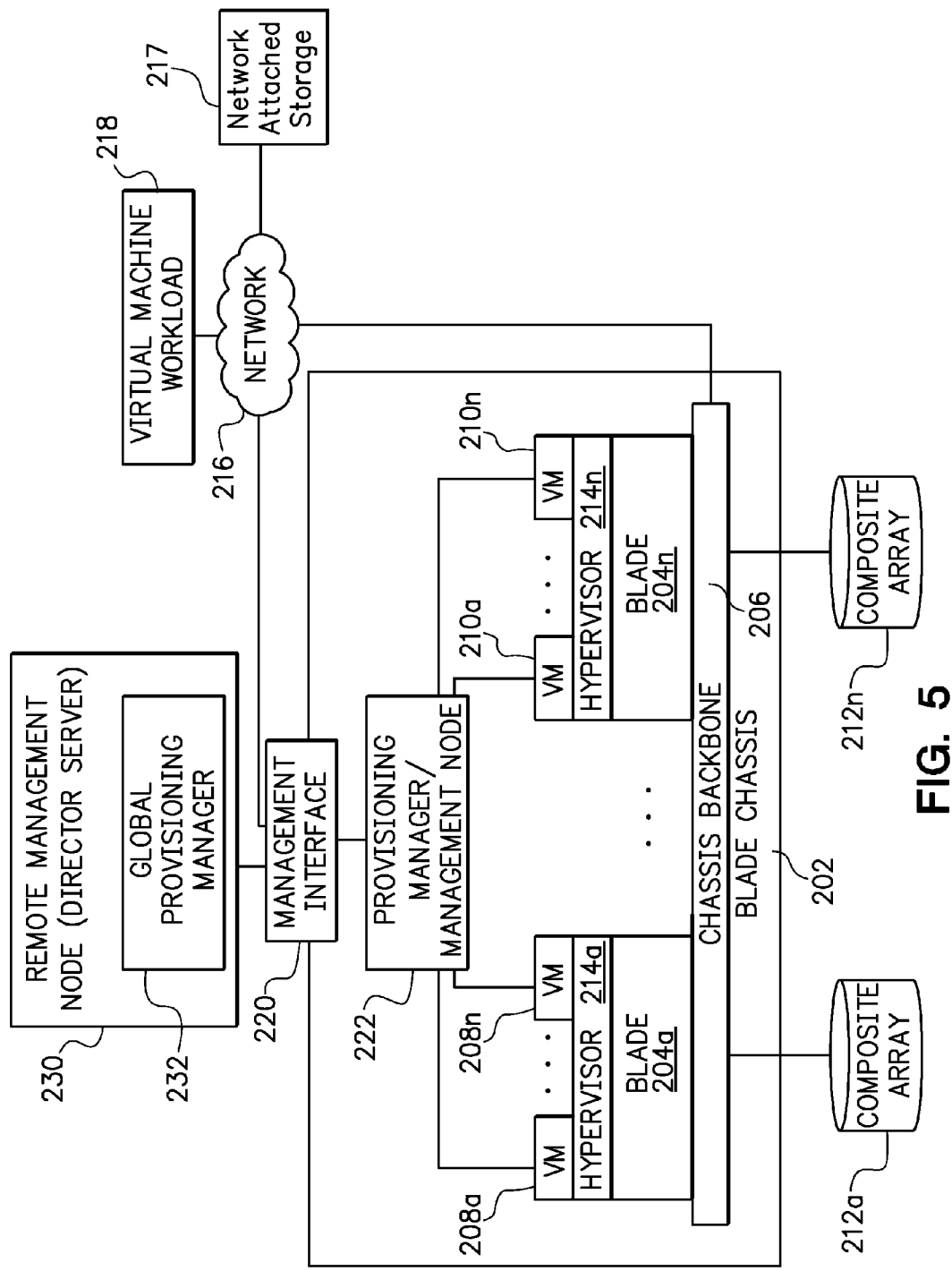
FIG. 5 is a diagram of an exemplary blade chassis that may be utilized according to one or more embodiments of the present invention.

FIG. 5 depicts an exemplary blade chassis that may be utilized in accordance with one or more embodiments of the present invention. The exemplary blade chassis 202 may operate in a "cloud" environment to provide a pool of resources. Blade chassis 202 comprises a plurality of blades 204a-n (where "a-n" indicates an integer number of blades) coupled to a chassis backbone 206. Each blade supports one or more virtual machines (VMs). As known to those skilled in the art of computers, a VM is a software implementation (emulation) of a physical computer. A single hardware computer (blade) can support multiple VMs, each running the same, different, or shared operating systems. In one embodiment, each VM can be specifically tailored and reserved for executing software tasks 1) of a particular type (e.g., database management, graphics, word processing etc.); 2) for a particular user, subscriber, client, group or other entity; 3) at a particular time of day or day of week (e.g., at a permitted time of day or schedule); etc.

As depicted in FIG. 5, blade 204a supports VMs 208a-n (where "a-n" indicates an integer number of VMs), and blade 204n supports VMs 210a-n (wherein "a-n" indicates an integer number of VMs). Blades 204a-n are coupled to a storage device 212 that provides a hypervisor 214, guest operating systems, and applications for users (not shown). Provisioning software from the storage device 212 allocates boot storage within the storage device 212 to contain the maximum number of guest operating systems, and associates applications based on the total amount of storage (such as that found within storage device 212) within the cloud. For example, support of one guest operating system and its associated applications may require 1 GByte of physical memory storage within storage device 212 to store the application, and another 1 GByte of memory space within storage device 212 to execute that application. If the total amount of memory storage within a physical server, such as boot storage device 212, is 64 GB, the provisioning software assumes that the physical server can support 32 virtual machines. This application can be located remotely in the network 216 and transmitted from the network attached storage 217 to the storage device 212 over the network. The global provisioning manager 232 running on the remote management node (Director Server) 230 performs this task. In this embodiment, the computer hardware characteristics are communicated from the VPD 151 to the VMPP 148. The VMPP 148 communicates the computer physical characteristics to the blade chassis provisioning manager 222, to the management interface 220, and to the global provisioning manager 232 running on the remote management node (Director Server) 230.

Note that chassis backbone 206 is also coupled to a network 216, which may be a public network (e.g., the Internet), a private network (e.g., a virtual private network or an actual internal hardware network), etc. Network 216 permits a virtual machine workload 218 to be communicated to a management interface 220 of the blade chassis 202. This virtual machine workload 218 is a software task whose execution, on any of the VMs within the blade chassis 202, is to request and coordinate deployment of workload resources with the management interface 220. The management interface 220 then transmits this workload request to a provisioning manager/management node 222, which is hardware and/or software logic capable of configuring VMs within the blade chassis 202 to execute the requested software task. In essence the virtual machine workload 218 manages the overall provisioning of VMs by communicating with the blade chassis management interface 220 and provisioning management node 222. Then this request is further communicated to the VMPP 148 in the computer system. Note that the blade chassis 202 is an exemplary computer environment in which the presently disclosed methods can operate. The scope of the presently disclosed system should not be limited to a blade chassis, however. That is, the presently disclosed methods can also be used in any computer environment that utilizes some type of workload management or resource provisioning, as described herein. Thus, the terms "blade chassis," "computer chassis," and "computer environment" are used interchangeably to describe a computer system that manages multiple computers/blades/servers.

Figure 6:
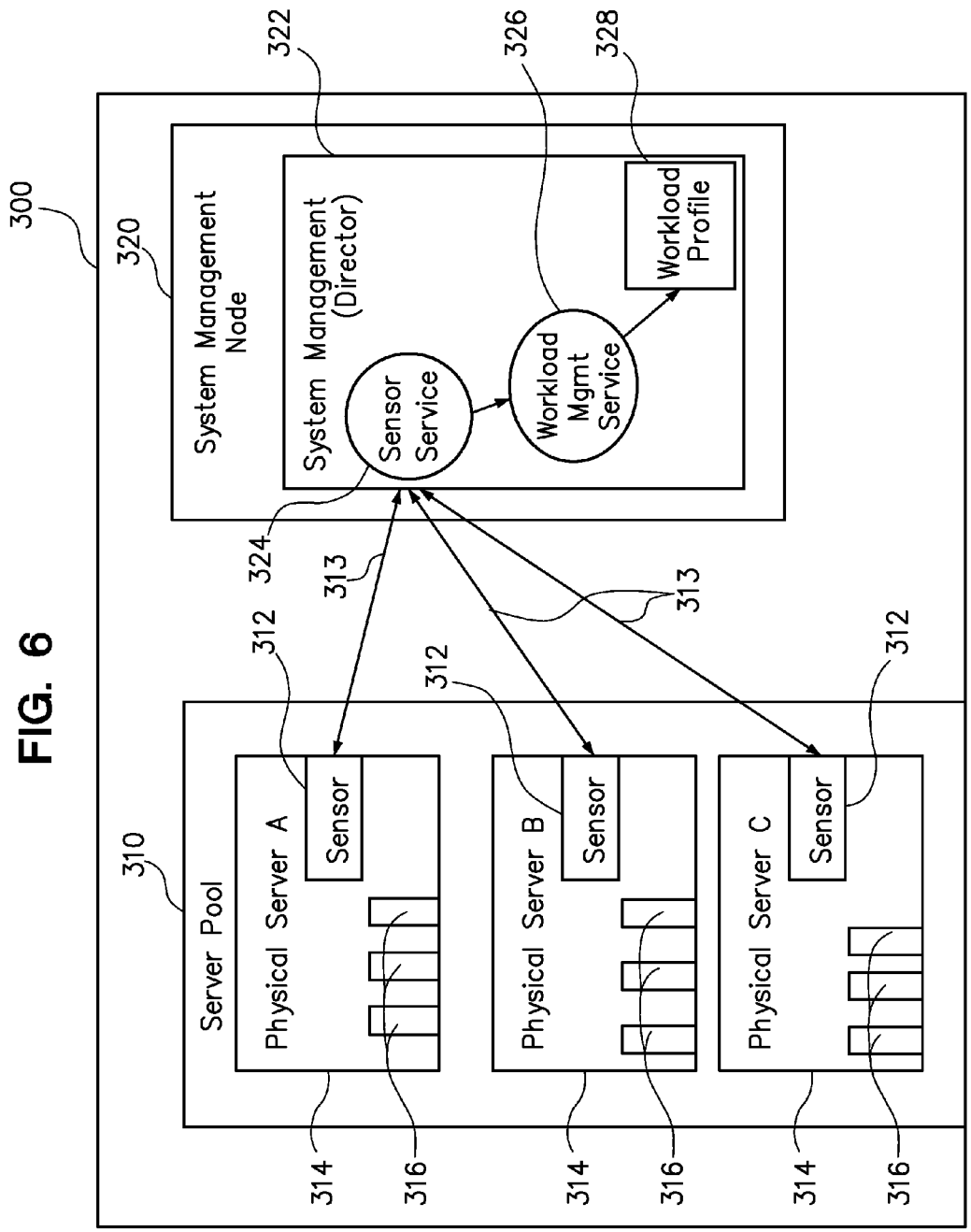
FIG. 6 is a diagram of physical servers equipped with corrosion sensors that provide a corrosion signal to a management node.

FIG. 6 is a diagram of a specific embodiment of a system 300 including a pool of physical servers 310 equipped with corrosion sensors 312 that provide a corrosion signal to a remote management node 320. The remote management node 320 runs systems management software 322, such as IBM's Director, that discovers all of the physical servers in the data center or cloud environment (system 300). The systems management software 322 also runs an exclusive daemon, referred to here as a Sensor Service 324, which reads data from the corrosion sensors 312 that are associated with the physical servers in the pool 310. In this example, the corrosion sensors 312 are associated with the physical servers 314 in a one-to-one association with the sensors 312 positioned within, on or around each physical server 314.

The remote management node 320 runs another exclusive daemon, referred to here as a workload management service 326, which is in communication with the sensor service daemon 324. The workload management service 326 maintains a workload profile table 328 for use in managing the workloads. For example, the workload profile identifies a functional type or category, such as production (critical), test (non-critical), development (non-critical), for each workload 316 running in the server pool 310. Any number of different functional types may be used as well.

Figure 7:
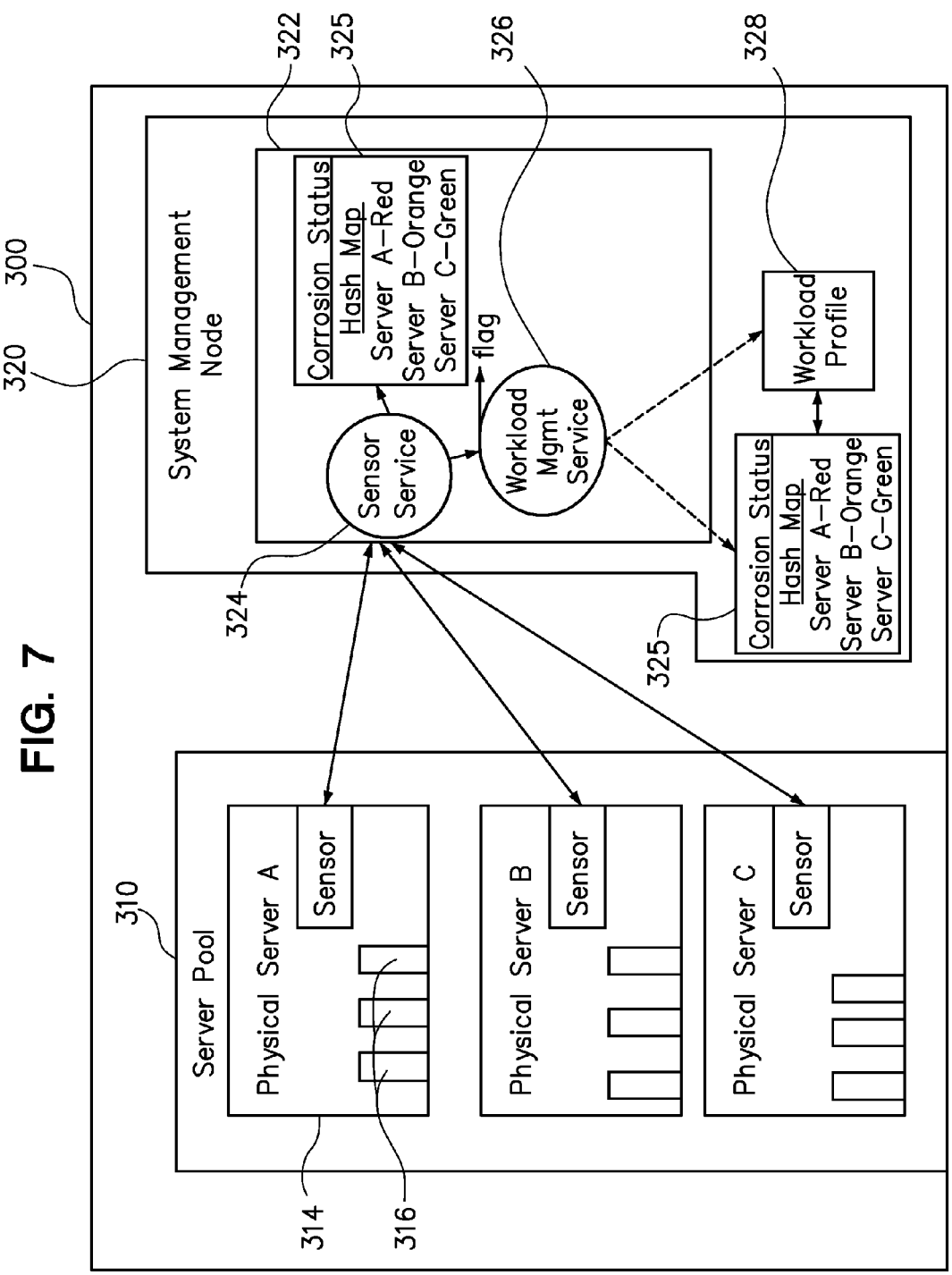
FIG. 7 is a diagram of the system of FIG. 6 showing that the sensor service maintains a corrosion status hash map reflecting the current corrosion level of each of the physical servers.

FIG. 7 is a diagram of the system of FIG. 6 showing that the sensor service 324 maintains a corrosion status hash map 325 reflecting the current corrosion level of each of the physical servers 314. The current corrosion level is based upon the corrosion rate signals 313 that the sensor service 324 receives from the corrosion sensors 312. In the embodiment shown, if the sensor service 324 determines that the corrosion level for one of the physical servers 314 exceeds a threshold or setpoint amount between a corrosion status level, then the sensor service 324 activates (alerts) a flag in the workload management service 326 and passes the hash map value as well. The corrosion level hash map shown here shows that physical server C has a green corrosion status indicating that the corrosion level is of no present concern, physical server B has an orange corrosion status indicating that the corrosion level is of moderate concern, and physical server A has a red corrosion status indicating that the corrosion level is jeopardizing the continued operation of the server. In response to receiving the alert and the corrosion rate hash map, the workload management service 326 uses the corrosion level data and the workload profile data to determine whether or not one or more workload should be removed from the physical server on which it is running. For example, if physical server A has a corrosion level or status of "red", and one or more of the workloads 316 running on physical server A has a workload profile of "production" (critical), then the workload management service 326 would remove such workloads from physical server A.

For purposes of this example, the workload management service 326 may make removal, relocation, and provisioning determinations based on instructions that a given workload type must run on a physical server having no greater than a given maximum corrosion level. Such an instruction set may be summarized in the following table:

| Workload Type (From Workload Profile) | Maximum Corrosion Level | The Workload Type May Be Run on Physical Servers Having These Acceptable Corrosion Levels |
|---|---|---|
| Production (Critical) | Green | Green only |
| Test (non-critical) | Orange | Green and Orange |
| Development (non-critical) | Red | Green, Orange and Red |

Figure 8:
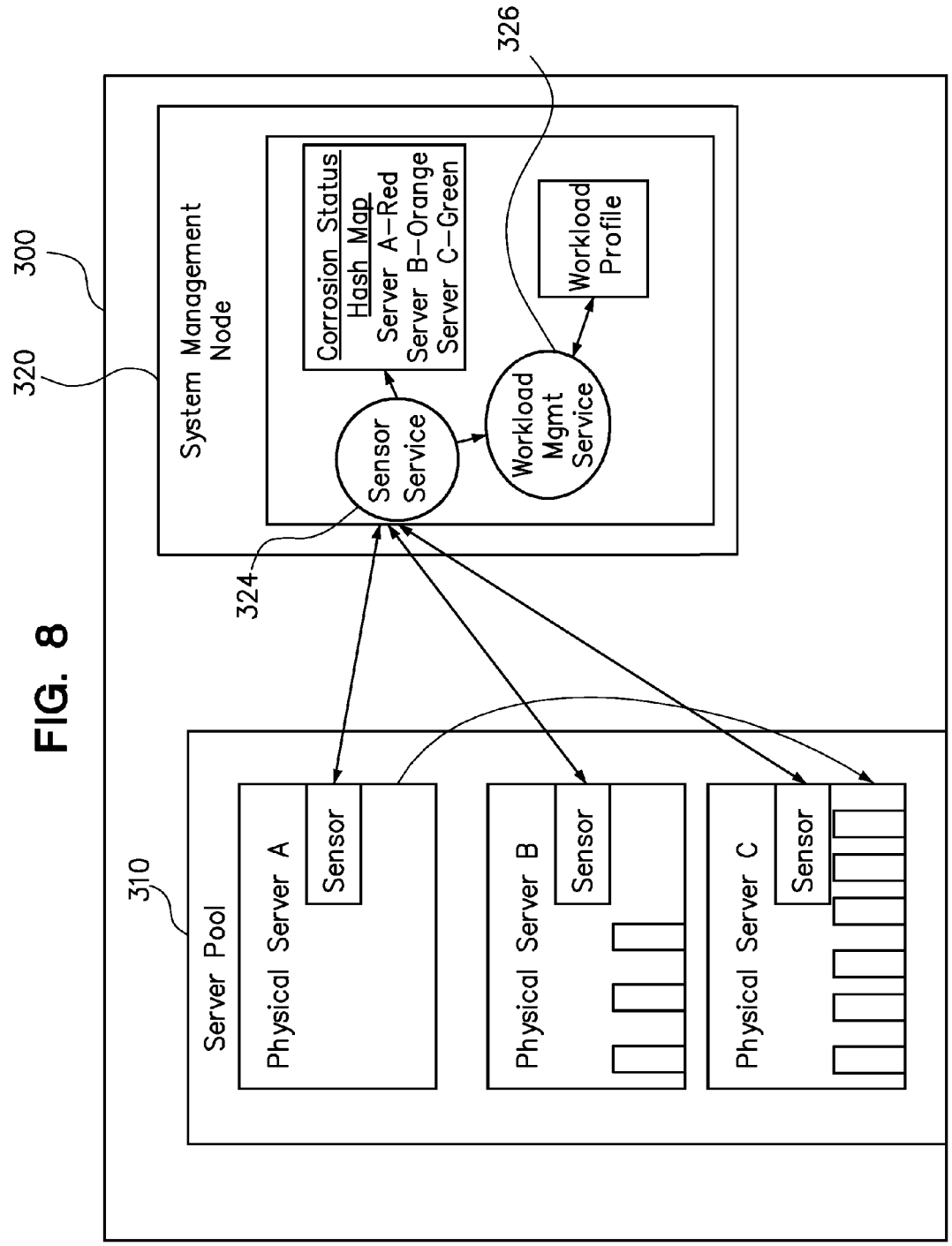
FIG. 8 is a diagram of the system of FIG. 7 showing that the workload management service has relocated virtual machine workloads from one physical server to another based on the corrosion status of the physical servers.

FIG. 8 is a diagram of the system of FIG. 7 showing that the workload management service 326 has relocated virtual machine workloads from physical server A to physical server C based on the corrosion status of the physical servers. A component of the workload management service responsible for identifying the best probable server to receive the workload may be referred to as a "placement holder." This would happen if the workloads on physical server A have a workload profile indicating that their maximum corrosion level is green or orange, meaning that those workloads should not be run on a server that has a corrosion status of red. As shown in FIG. 8, the workloads have been relocated from physical server A to physical server C, which has a corrosion status of green. With no remaining workloads being run on physical server A, physical server A may be powered off.

Figure 9:
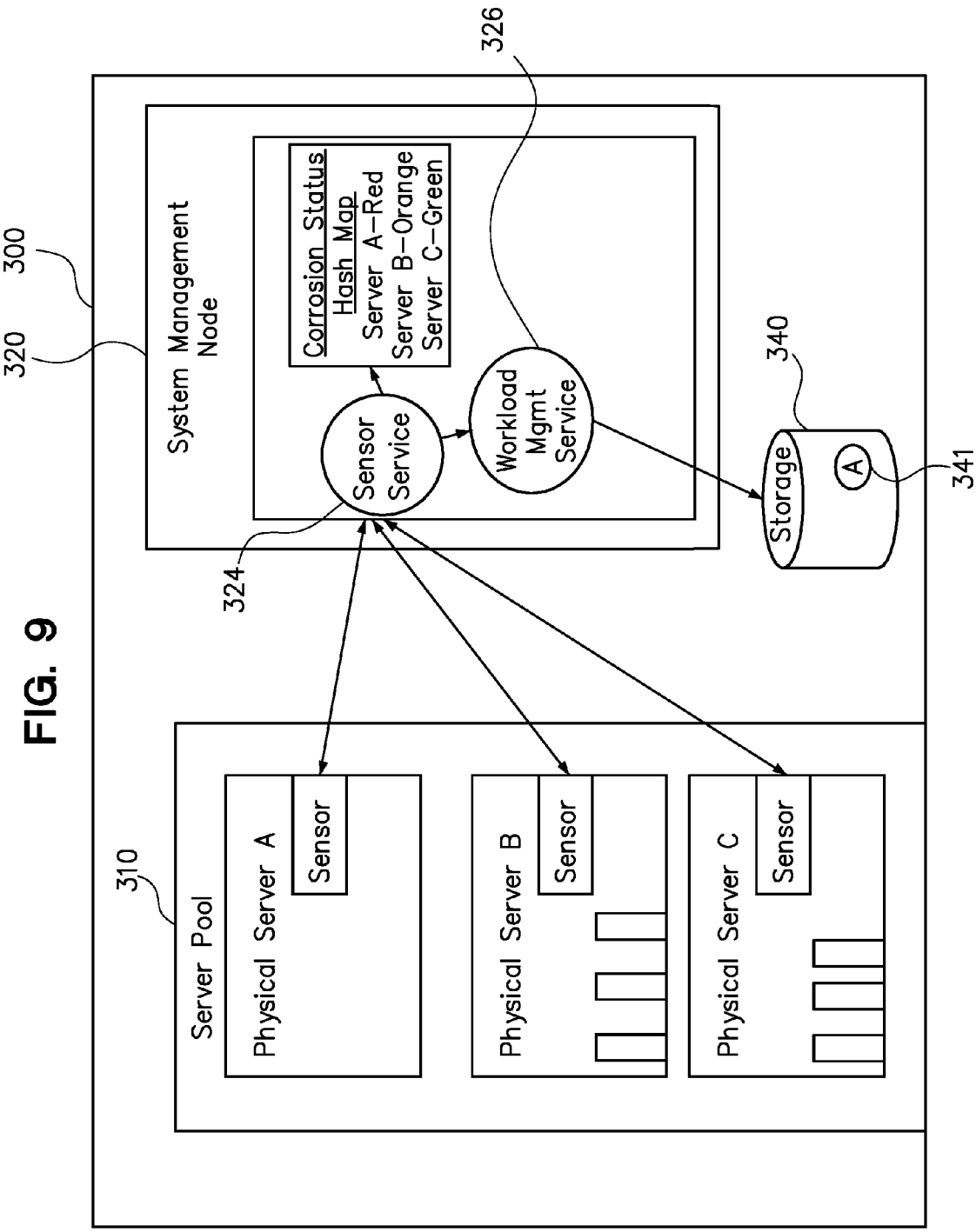
FIG. 9 is a diagram of the system of FIG. 7 showing that the workload management service has captured an image of the virtual machine workloads and stored that image in a computer readable storage medium.

FIG. 9 is a diagram of the system of FIG. 7 showing that the workload management service 326 has captured an image of the virtual machine workloads from physical server A and stored that image in a computer readable storage medium 340, such as a hard disk drive. The image of the workloads may be later redeployed to any of the servers in the server pool, which might include a replacement to physical server A.

Figure 10:
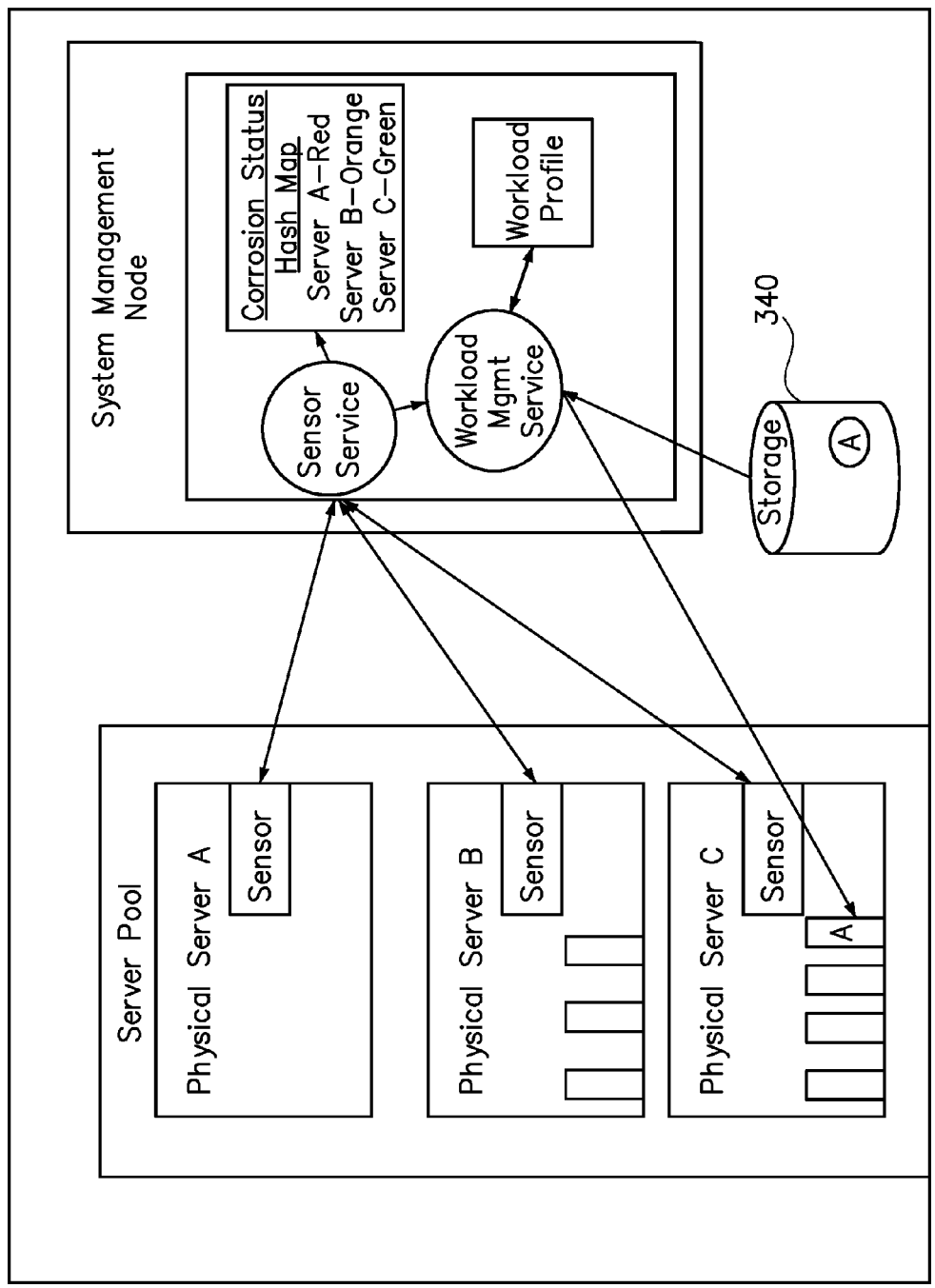
FIG. 10 is a diagram of the system of FIG. 9 showing that the workload management service has redeployed the previously stored image of the virtual machine workloads.

FIG. 10 is a diagram of the system of FIG. 9 showing that the workload management service 326 has redeployed the previously stored image of the virtual machine workloads (originally from physical server A) to physical server C. Preferably, the workload management service 326 has considered the workload profile for the workloads and determined that the workloads may be run on physical server C, since physical server C has a corrosion status of green and all workloads are allowed to be run on green. In addition to determining that physical server C is a relatively healthy server that satisfies the workload profile of the workloads, the workload management service 326 should also determine that physical server C has sufficient resources to handle all the partitions from the contaminated servers. If there are insufficient resources on physical server C, then the workload management server 326 should further consider whether the orange corrosion status of physical server B allows physical server B to run the workloads in agreement with the associated workload profiles. It is possible that some workloads may be relocated to physical server B, while other workloads may be relocated only to physical server A due to its green corrosion level.

Figure 11:
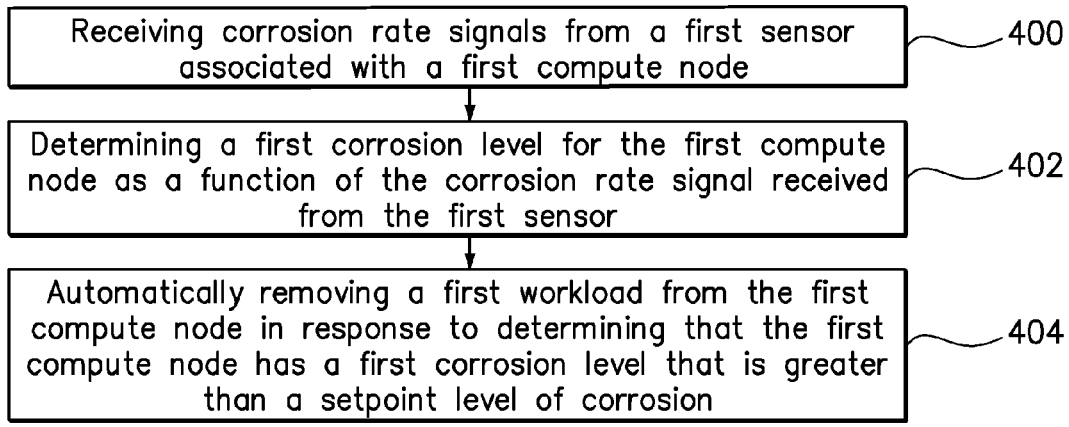
FIG. 11 is a flowchart of a first computer-implemented method for workload management.

FIG. 11 is a flowchart of a computer-implemented method for workload management. In step 400, corrosion rate signals are receiving from a first sensor associated with a first compute node. In step 402 a first corrosion level for the first compute node is determined as a function of the corrosion rate signal received from the first sensor. Step 404 then includes automatically removing a first workload from the first compute node in response to determining that the first compute node has a first corrosion level that is greater than a setpoint level of corrosion.

Figure 12:
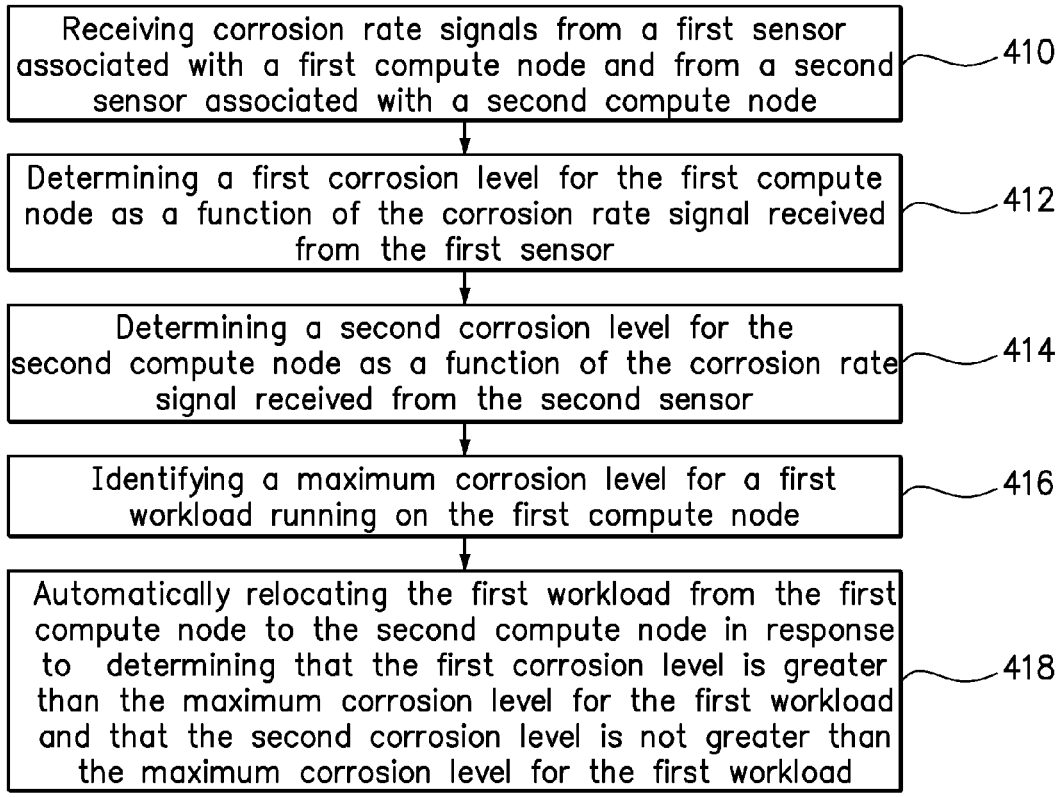
FIG. 12 is a flowchart of a second computer-implemented method for workload management.

FIG. 12 is a flowchart of a computer-implemented method for workload management. Step 410 includes receiving corrosion rate signals from a first sensor associated with a first compute node and from a second sensor associated with a second compute node. Step 412 includes determining a first corrosion level for the first compute node as a function of the corrosion rate signal received from the first sensor, and step 414 includes determining a second corrosion level for the second compute node as a function of the corrosion rate signal received from the second sensor. Then, in step 416, a maximum corrosion level for a first workload running on the first compute node is determined. Step 418 includes automatically relocating the first workload from the first compute node to the second compute node in response to determining that the first corrosion level is greater than the maximum corrosion level for the first workload and that the second corrosion level is not greater than the maximum corrosion level for the first workload.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for workload management, comprising:
    receiving corrosion rate signals from a first sensor associated with a first compute node;
    determining a first corrosion level for the first compute node as a function of the corrosion rate signal received from the first sensor; and
    automatically removing a first workload from the first compute node in response to determining that the first compute node has a first corrosion level that is greater than a setpoint level of corrosion.

2. The computer-implemented method of claim 1, further comprising:
    storing an image of the first workload on a computer readable storage device that is accessible without the first compute node;
    determining a second corrosion level for a second compute node as a function of a corrosion rate signal received from a second sensor; and
    redeploying the image of the first workload to the second compute node, wherein the second corrosion level is not greater than the setpoint level of corrosion.

3. The computer-implemented method of claim 1, further comprising:
    determining a second corrosion level for a second compute node as a function of a corrosion rate signal received from a second sensor;
    wherein automatically removing the first workload from the first compute node in response to determining that the first corrosion level is greater than the setpoint level of corrosion, includes automatically relocating the first workload from the first compute node to the second compute node in response to determining that the first corrosion level is greater than a setpoint level of corrosion and the second corrosion level is not greater than the setpoint level of corrosion.

4. The computer-implemented method of claim 1, wherein the corrosion rate signals are received from the first sensors over the installed lifetime of the first compute node.

5. The computer-implemented method of claim 1, wherein automatically removing the first workload from the first compute node in response to determining that the first corrosion level is greater than the setpoint level of corrosion, includes:
    automatically removing all of the workloads running on the first compute node from the first compute node in response to determining that the first corrosion level is greater than a setpoint level of corrosion.

6. The computer-implemented method of claim 5, further comprising:
    storing an image of all of the workloads running on the first compute node; and
    determining a second corrosion level for a second compute node as a function of corrosion rate signals received from a second sensor; and
    redeploying the image of all of the workloads from storage to the second compute node in response to determining that the second corrosion level is not greater than a setpoint level of corrosion.

7. The computer-implemented method of claim 1, further comprising:
    determining a second corrosion level for a second compute node as a function of corrosion rate signals received from a second sensor;
    wherein automatically removing the first workload from the first compute node in response to determining that the first corrosion level is greater than the setpoint level of corrosion, includes automatically relocating all of the workloads running on the first compute node from the first compute node to the second compute node in response to determining that the first corrosion level is greater than a setpoint level of corrosion.

8. The computer-implemented method of claim 3, wherein the first compute node and the first sensor are in a first location exposed to a first set of environmental conditions and the second compute node and the second sensor are in a second location exposed to a second set of environmental conditions.

9. A computer-implemented method for workload management, comprising:

receiving corrosion rate signals from a first sensor associated with a first compute node and from a second sensor associated with a second compute node;

determining a first corrosion level for the first compute node as a function of the corrosion rate signal received from the first sensor;

determining a second corrosion level for the second compute node as a function of the corrosion rate signal received from the second sensor;

identifying a maximum corrosion level for a first workload running on the first compute node; and automatically relocating the first workload from the first compute node to the second compute node in response to determining that the first corrosion level is greater than the maximum corrosion level for the first workload and that the second corrosion level is not greater than the maximum corrosion level for the first workload.

10. The computer-implemented method of claim 9, wherein the maximum corrosion level for the first workload is included in a workload profile.

11. The computer-implemented method of claim 9, further comprising:

identifying a maximum corrosion level for a second workload running on the first compute node; and continuing to run the second workload on the first compute node in response to determining that the first corrosion level is not greater than a maximum corrosion level for the second workload.

12. The computer-implemented method of claim 11, wherein the maximum corrosion level for the second workload is included in a workload profile.

13. The computer-implemented method of claim 12, wherein the maximum corrosion level of the first workload is determined by a type of function performed by the first workload, and wherein the maximum corrosion level of the second workload is determined by a type of function performed by the second workload.

14. A computer program product including computer usable program code embodied on a non-transitory computer usable storage medium for managing workload in a computer system, the computer program product comprising:

computer usable program code for receiving corrosion rate signals from a first sensor associated with a first compute node and from a second sensor associated with a second compute node;

computer usable program code for determining a first corrosion level for the first compute node as a function of the corrosion rate signal received from the first sensor; and computer usable program code for automatically removing a first workload from the first compute node in response to determining that the first compute node has a first corrosion level that is greater than a setpoint level of corrosion.

15. The computer program product of claim 14, further comprising:

computer usable program code for storing an image of the first workload on a computer readable storage device that is accessible without the first compute node;

computer usable program code for determining a second corrosion level for the second compute node as a function of the corrosion rate signal received from the second sensor; and computer usable program code for redeploying the image of the first workload to the second compute node, wherein the second corrosion level is not greater than the setpoint level of corrosion.

16. The computer program product of claim 14, further comprising:

computer usable program code for determining a second corrosion level for the second compute node as a function of the corrosion rate signal received from the second sensor;

wherein automatically removing the first workload from the first compute node in response to determining that the first corrosion level is greater than the setpoint level of corrosion, includes automatically relocating the first workload from the first compute node to the second compute node in response to determining that the first corrosion level is greater than a setpoint level of corrosion and the second corrosion level is not greater than the setpoint level of corrosion.

* * * * *